United States Patent
Umlauft et al.

(10) Patent No.: US 9,434,484 B2
(45) Date of Patent: Sep. 6, 2016

(54) TRANSPORT DEVICE FOR USE WHEN MOUNTING INTERIOR COMPONENT MODULES IN AN AIRCRAFT

(75) Inventors: Sebastian Umlauft, Hamburg (DE); Dirk Humfeldt, Hamburg (DE); Niklas Halfmann, Hamburg (DE); Dieter Krause, Buchholz (DE)

(73) Assignee: Airbus Operations GmbH (DE)

( * ) Notice: Subject to any disclaimer, the term of this patent is extended or adjusted under 35 U.S.C. 154(b) by 1317 days.

(21) Appl. No.: 13/375,143

(22) PCT Filed: Apr. 29, 2010

(86) PCT No.: PCT/EP2010/002640
§ 371 (c)(1),
(2), (4) Date: Feb. 20, 2012

(87) PCT Pub. No.: WO2010/136102
PCT Pub. Date: Dec. 2, 2010

(65) Prior Publication Data
US 2012/0131779 A1 May 31, 2012

Related U.S. Application Data

(60) Provisional application No. 61/182,301, filed on May 29, 2009.

(30) Foreign Application Priority Data

May 29, 2009 (DE) .................. 10 2009 023 393

(51) Int. Cl.
*B23P 19/00* (2006.01)
*B64F 5/00* (2006.01)
*B62B 3/10* (2006.01)

(52) U.S. Cl.
CPC .............. *B64F 5/0036* (2013.01); *B62B 3/10* (2013.01); *B64F 5/0009* (2013.01); *Y10T 29/53978* (2015.01)

(58) Field of Classification Search
CPC ...... B64F 5/0036; B64F 5/0009; B62B 3/10; Y10T 29/53978
USPC .................. 29/281.5; 414/279, 265, 154
See application file for complete search history.

(56) References Cited

U.S. PATENT DOCUMENTS 2,512,798 A * 6/1950 Hodges ................. B60P 1/6409
    104/48
2,591,153 A * 4/1952 Hodges ................. B60P 1/6409
    414/499

(Continued)

FOREIGN PATENT DOCUMENTS

DE    202004015422 U1    12/2004
DE        61182301    *    5/2009

(Continued)

OTHER PUBLICATIONS

International Search Report and Written Opinion established by the ISA/EP on Sep. 30, 2010 in connection with PCT/EP2010/002640.

*Primary Examiner* — Monica Carter
*Assistant Examiner* — Mahdi H Nejad
(74) *Attorney, Agent, or Firm* — Barnes & Thornburg LLP

(57) ABSTRACT

A transport device for use when mounting interior component modules in an aircraft includes an undercarriage and an interior component module carrier unit. The interior component module carrier unit is supported on the undercarriage and is adapted to be connected to an interior component module, which is preassembled outside of the aircraft, in order to transport the interior component module with the aid of the transport device into a final assembly position in an aircraft fuselage element. At least a part of the interior component module carrier unit is movable relative to the undercarriage such that an interior component module connected to the interior component module carrier unit is movable horizontally and vertically relative to the undercarriage.

13 Claims, 3 Drawing Sheets

(56) References Cited

U.S. PATENT DOCUMENTS

| | | | | |
|---|---|---|---|---|
| 2,857,922 | A * | 10/1958 | Effinger | C23G 3/04 104/48 |
| 2,937,879 | A * | 5/1960 | Lion | B65D 90/18 220/1.5 |
| 3,235,106 | A * | 2/1966 | Diehl | E04H 6/305 187/213 |
| 3,298,546 | A * | 1/1967 | Jones | F27D 1/1858 110/177 |
| 4,490,883 | A * | 1/1985 | Gauron | B64C 1/066 16/245 |
| 5,032,173 | A * | 7/1991 | Goforth | F27D 3/0024 266/200 |
| 5,110,090 | A * | 5/1992 | McDuffie | 254/124 |
| 5,249,352 | A * | 10/1993 | Landers | B27M 3/0073 227/111 |
| 5,549,287 | A | 8/1996 | Loucks | |
| 5,570,988 | A * | 11/1996 | Gallaway | B62B 5/0003 414/343 |
| 5,851,007 | A * | 12/1998 | Swartzlander | G01M 15/02 269/16 |
| 6,109,424 | A * | 8/2000 | Doan | B62D 65/02 198/468.8 |
| 6,546,616 | B2 * | 4/2003 | Radowick | B23Q 3/186 269/58 |
| 7,264,226 | B2 * | 9/2007 | Smith | F16M 11/18 254/103 |
| 8,146,222 | B2 * | 4/2012 | Frauen | B64F 5/0009 228/44.3 |
| 8,166,634 | B2 * | 5/2012 | Tohyama | B62D 65/10 29/714 |
| 8,291,829 | B1 * | 10/2012 | Dunlavy | B61B 10/04 104/120 |
| 2003/0049115 | A1 * | 3/2003 | Yang | H01L 21/67724 414/663 |
| 2003/0121874 | A1 * | 7/2003 | Koester | B62B 3/006 211/187 |
| 2005/0115048 | A1 * | 6/2005 | Reccius | B21D 11/20 29/505 |
| 2007/0297879 | A1 * | 12/2007 | Yuyama | A61G 12/001 414/279 |
| 2010/0028113 | A1 * | 2/2010 | Tohyama | B62D 65/10 414/495 |
| 2010/0104414 | A1 * | 4/2010 | Chilson | B61B 10/04 414/800 |
| 2010/0301167 | A1 * | 12/2010 | Humfeldt | B64F 5/0009 244/131 |
| 2010/0301537 | A1 * | 12/2010 | Humfeldt | B64D 11/003 269/55 |
| 2011/0099788 | A1 * | 5/2011 | Kilibarda | B62D 65/18 29/428 |
| 2012/0009049 | A1 * | 1/2012 | Sekiguchi | B66C 17/08 414/399 |
| 2013/0200213 | A1 * | 8/2013 | Umlauft | B64C 1/066 244/129.1 |

FOREIGN PATENT DOCUMENTS

| | | |
|---|---|---|
| EP | 1905690 A2 | 4/2008 |
| FR | 2774609 A1 | 8/1999 |
| JP | 04-269034 * | 4/1994 |
| JP | 4221619 * | 9/2007 |
| WO | 02/48017 A1 | 6/2002 |
| WO | PCT JP2008 064077 * | 7/2008 |
| WO | WO 2009 031379 * | 3/2009 |
| WO | 2010/048495 A1 | 4/2010 |

* cited by examiner

TRANSPORT DEVICE FOR USE WHEN MOUNTING INTERIOR COMPONENT MODULES IN AN AIRCRAFT

CROSS-REFERENCE TO RELATED APPLICATIONS

This application is the U.S. national phase of PCT/EP2010/002640 filed Apr. 29, 2010. PCT/EP2010/002640 claims the benefit under the Convention of German Patent Application No. 102009023393.8 and U.S. Provisional Patent Application No. 61/182,301 both filed on May 29, 2009.

FIELD OF THE INVENTION

The invention relates to a transport device for use when mounting interior component modules in an aircraft.

BACKGROUND

When mounting interior components in an aircraft it is currently customary for components, such as for example dado panels, side linings, ceiling linings, light strips, luggage compartments and the like, to be connected individually to the aircraft structure. As each component has to be separately positioned and fastened to the aircraft structure, mounting these components is very time-consuming. In a similar fashion pipes, which are used for example as air-carrying lines of an aircraft air conditioning system or for the water supply in an aircraft cabin, as well as electric lines are currently also fastened individually in a time-consuming manner to the aircraft structure. After mounting, in the course of a final inspection all of the lines have to be checked for proper functioning. In particular all of the pipes have to be checked for leaks, while in the case of the electric lines all of the interfaces have to be checked. These tests are likewise relatively laborious as the lines and interfaces to be tested are often accessible only with difficulty in the mounted state of the lines.

For this reason attempts are being made to preassemble and test interior components provided for mounting in an aircraft, for example in an aircraft cabin, as far as possible outside of the aircraft. In particular large-area modules, which may comprise a plurality of overhead luggage compartments, a plurality of side linings as well as further interior components, such as for example electric lines, air-carrying lines of an aircraft air conditioning system or pipes used for the water supply in the aircraft cabin, personal service units and personal service channels, are to be preassembled and tested outside of the aircraft optionally with the aid of a suitable assembly device configured for example in the form of an assembly frame. The large-area modules are then to be transported into a final assembly position in an aircraft fuselage element.

SUMMARY

The invention is geared to the object of providing a transport device that enables easy transporting of aircraft interior component modules preassembled outside of an aircraft into a final assembly position in an aircraft fuselage element as well as comfortable final assembly of the interior component modules in the aircraft fuselage element.

To achieve this object, a transport device according to the invention that is provided for use when mounting interior component modules in an aircraft comprises an undercarriage as well as an interior component module carrier unit that is supported on the undercarriage. The interior component module carrier unit is adapted to be connected to an interior component module that is preassembled outside of the aircraft. For example the interior component module carrier unit may be fashioned in such a way that it may be connected to a large-area module that comprises a plurality of overhead luggage compartments, a plurality of side lining panels as well as further interior components, such as for example electric lines, air-carrying lines of an aircraft air conditioning system or pipes used for the water supply in the aircraft cabin, personal service units and personal service channels.

In the state of connection to the interior component module carrier unit the interior component module may be transported with the aid of the transport device according to the invention into a final assembly position in an aircraft fuselage element. The aircraft fuselage element may be for example a fuselage shell that is open at least one end. The large-area module may however alternatively be introduced into an almost completely or completely constructed aircraft fuselage. The essential point is merely that the aircraft fuselage element has an entrance that allows the large-area module to be introduced into its final assembly position in the aircraft fuselage element.

At least a part of the interior component module carrier unit is movable relative to the undercarriage in such a way that an interior component module connected to the interior component module carrier unit is movable horizontally and vertically relative to the undercarriage. In other words, at least one component of the interior component module carrier unit is movable horizontally relative to the undercarriage and at least one component of the interior component module carrier unit is movable vertically relative to the undercarriage in order to guarantee a horizontal and a vertical mobility of the interior component module connected to the interior component module carrier unit relative to the undercarriage. In the transport device according to the invention the same component of the interior component module carrier unit or the entire interior component module carrier unit may be designed so as to be movable horizontally and vertically relative to the undercarriage. Alternatively, however, a component of the interior component module carrier unit may be movable horizontally relative to the undercarriage, and another component of the interior component module carrier unit may be movable vertically relative to the undercarriage.

Furthermore, in principle at least one component of the interior component module carrier unit may be movable horizontally relative to the undercarriage only in one direction, i.e. either only in a direction parallel to a longitudinal axis of the transport device (x-direction) or only in a direction perpendicular to the longitudinal axis of the transport device (y-direction). An interior component module connected to the interior component module carrier unit is then movable horizontally also only in one direction relative to the undercarriage. Alternatively, at least one component of the interior component module carrier unit and hence an interior component module connected to the interior component module carrier unit may be movable horizontally but also both in x-direction and in y-direction. If the at least one component of the interior component module carrier unit is movable horizontally in only one direction, it is movable preferably in y-direction in order to enable a positioning of an interior component module connected to the interior component module carrier unit relative to a side wall of the aircraft fuselage element, i.e. the moving of the interior component module towards the side wall or the moving of the interior component module away from the side wall in a direction perpendicular to the side wall.

With the aid of the transport device according to the invention the interior component module that is to be mounted in the aircraft fuselage element may first be moved into a desired position in the aircraft fuselage element. The horizontal and the vertical position of the interior component module connected to the interior component module carrier unit relative to the undercarriage may then be finely adjusted by means of a suitable displacement of the at least one component of the interior component module carrier unit relative to the undercarriage of the transport device.

The transport device according to the invention has the advantage that it enables easy and comfortable transporting of interior component modules preassembled outside of the aircraft into a final assembly position in an aircraft fuselage element. The final assembly of the interior component modules in the aircraft fuselage element is significantly facilitated by the transport device according to the invention because the fine adjustment of the position of the interior component modules in the aircraft fuselage element not only allows a proper positioning of the interior component modules relative to the aircraft fuselage element but may also be used to compensate dimensional tolerances of the interior component modules. Through use of the transport device according to the invention the process of mounting interior components in an aircraft may therefore be made more efficient as a whole.

The interior component module carrier unit of the transport device according to the invention is preferably of a two-piece construction. For example the interior component module carrier unit may comprise an L-shaped carrier unit, which is connected to the undercarriage, as well as a C-shaped carrier unit, which is connected to the L-shaped carrier unit. The L-shaped carrier unit is then carried preferably directly by the undercarriage, while the C-shaped carrier unit is supported via the L-shaped carrier unit on the undercarriage. The dimensions of the interior component module carrier unit and hence of the L-shaped carrier unit and the C-shaped carrier unit in the direction of a longitudinal axis of the transport device according to the invention are preferably adapted to the dimensions of an interior component module that is to be transported by means of the transport device according to the invention. To minimize the weight of the transport device according to the invention the interior component module carrier unit, like the undercarriage, is preferably constructed from individual struts.

In order to realize the horizontal mobility of at least a part of the interior component module carrier unit relative to the undercarriage, the L-shaped carrier unit of the interior component module carrier unit may be designed so as to be movable horizontally relative to the undercarriage. For example the transport device according to the invention may comprise a sliding unit that enables a horizontal movement of the L-shaped carrier unit of the interior component module carrier unit, and hence also of the C-shaped carrier unit of the interior component module carrier unit that is connected to the L-shaped carrier unit, relative to the undercarriage. Thus, if an interior component module is connected to the interior component module carrier unit of the transport device according to the invention, the interior component module may easily be moved horizontally relative to the undercarriage by means of a horizontal movement of the L-shaped carrier unit of the interior component module carrier unit relative to the undercarriage. As a result, the horizontal final assembly position of the interior component module may be finely adjusted in a comfortable manner. For example, by means of a movement of the L-shaped carrier unit of the interior component module carrier unit relative to the undercarriage the interior component module may be moved in y-direction towards a side wall of the aircraft fuselage element or away from the side wall of the aircraft fuselage element.

In order to realize the vertical mobility of at least a part of the interior component module carrier unit relative to the undercarriage, on the other hand, the C-shaped carrier unit of the interior component module carrier unit is preferably movable vertically relative to the L-shaped carrier unit of the interior component carrier unit. For this purpose, a suitable lifting device may be provided between the L-shaped carrier unit and the C-shaped carrier unit of the interior component module carrier unit. If an interior component module is fastened to the interior component module carrier unit, in particular to the C-shaped carrier unit of the interior component module carrier unit, then by means of a vertical movement of the C-shaped carrier unit relative to the L-shaped carrier unit a vertical movement of the interior component module relative to the undercarriage of the transport device according to the invention may also be realized in a comfortable manner. As a result, the interior component module for example during its final assembly in the aircraft fuselage element may be moved to a height, at which the interior component module may be easily connected to the structure of the aircraft fuselage element.

Preferably on the interior component module carrier unit of the transport device according to the invention a suspension device may be provided for fastening an interior component module in a suspended manner on the transport device. The suspension device may be configured for example in the form of a holder that is provided for interacting with a holder mounted on the interior component module. The suspension device and the holder mounted on the interior component module are preferably fashioned in such a way that the holder mounted on the interior component module and hence the interior component module may be fastened to the structure of the aircraft fuselage element before the holder mounted on the interior component module is uncoupled from the suspension device of the transport device.

Alternatively or in addition thereto, a support device may be provided on the interior component module carrier unit of the transport device according to the invention for supporting an interior component module on the transport device. Such a development of the transport device according to the invention is advantageous particularly if the transport device is to be used to transport interior component modules that comprise an overhead luggage compartment or a plurality of overhead luggage compartments as well as a side lining panel or a plurality of side lining panels. The support device is preferably mounted in such a position on the interior component module carrier unit that it supports an interior component module during transport on the transport device in a region of the interior component module that is not part of the visible surface of the interior component module in the finally assembled state of the interior component module in the aircraft fuselage element. This prevents any impairment of the visual appearance of the interior component module.

If interior component module carrier unit comprises both a suspension device and a support device, the suspension device may advantageously be used to fasten the overhead luggage compartment and hence the entire interior component module in a suspended manner on the interior component module carrier unit of the transport device according to the invention. The support device may be used to support the overhead luggage compartment, for example in a region of a base plate that is not visible in the finally assembled state of the overhead luggage compartment, and hence to stabilize the entire interior component module in its position on the transport device. With the aid of a suspension device and/or a support device the interior component module may be disposed in a position on the transport device that corresponds substantially to the position that the interior component module occupies in its finally assembled state in the aircraft fuselage element. It is therefore possible after transport on the transport device to dispense with a laborious repositioning of the interior component module for its final assembly in the aircraft fuselage element.

The suspension device for the suspended fastening of an interior component module that is to be transported by means of the transport device according to the invention is preferably mounted on the C-shaped carrier unit of the interior component module carrier unit. For example the suspension device may be mounted on an upper horizontal unit of the C-shaped carrier unit of the interior component module carrier unit that is remote from the undercarriage of the transport device. The suspension device is preferably fastened to a strut of the C-shaped carrier unit that extends parallel to the longitudinal axis of the transport device. Depending on the dimensions of the interior component module in the direction of the longitudinal axis of the transport device the suspension device may be of a multi-piece construction, i.e. comprise a plurality of individual suspension devices that are arranged distributed along the longitudinal axis of the transport device.

The support device for supporting an interior component module that is provided for transport on the transport device according to the invention is preferably mounted likewise on the C-shaped carrier unit of the interior component module carrier unit. For example the support device may be mounted on a lower horizontal unit of the C-shaped carrier unit that faces the undercarriage of the transport device. For example the support device may extend in a direction remote from the undercarriage from a strut of the C-shaped carrier unit that is aligned substantially perpendicular to the longitudinal axis of the transport device. Where desired or necessary, the support device may also be of a multi-piece construction and comprise a plurality of individual support devices. The individual support devices may then extend from a strut or a plurality of struts of the horizontal unit of the C-shaped carrier unit that is/are aligned substantially parallel to the longitudinal axis of the transport device.

In principle the transport device may be configured in such a way that at least a part of the interior component module carrier unit is only manually movable horizontally and/or vertically relative to the undercarriage. The transport device may however also comprise a first power-assist device for assisting the horizontal movement of at least a part of the interior component module carrier unit relative to the undercarriage. In addition or alternatively thereto the transport device may be provided with a second power-assist device for assisting the vertical movement of at least a part of the interior component module carrier unit relative to the undercarriage.

The first and/or the second power-assist device may be configured for example in the form of a pneumatic- or hydraulic unit. The use of a power-assist device comprising an electric motor is moreover also conceivable. The first and/or the second power-assist device may be fashioned in such a way as to merely assist the horizontal and/or vertical movement of at least a part of the interior component module carrier unit relative to the undercarriage. Alternatively, the first and/or the second power-assist device may however be designed so as to enable a horizontal and/or vertical movement of at least a part of the interior component module carrier unit relative to the undercarriage without additional manual assistance. With the aid of a first and/or a second power-assist device at least a part of the interior component module carrier unit and hence an interior component module connected to the interior component module carrier unit may be moved in a particularly comfortable manner relative to the undercarriage of the transport device according to the invention.

The undercarriage of the transport device according to the invention preferably comprises a plurality of vertical struts as well as a plurality of horizontal struts. These struts preferably define a substantially cuboidal basic body of the undercarriage. By virtue of constructing the undercarriage with the aid of struts the undercarriage may advantageously be of a particularly lightweight construction. Where desired or necessary, the strut basic body of the undercarriage may be strengthened by means of a plurality of diagonal struts. In this way, the lightweight construction of the undercarriage is retained but the undercarriage is lent a stability that also allows large interior component modules to be transported over possibly also not entirely even ground.

The undercarriage of the transport device according to the invention is fashioned in such a way that the transport device is movable freely or under guidance in an aircraft final assembly installation, for example a final assembly hangar. For this purpose a plurality of wheels are preferably fastened to the undercarriage. The wheels mounted on the undercarriage may be fashioned in such a way that the undercarriage is movable under the guidance of suitable guide rails in the final assembly installation. Particularly versatile use of the transport device according to the invention is however possible if the undercarriage of the transport device are provided with wheels that enable free mobility of the transport device in the final assembly installation. In order, where necessary, to lock the transport device in a desired position, the transport device is preferably provided with a locking device. The locking device may comprise for example brakes that interact with the wheels of the undercarriage. To enable comfortable operation of the locking device, the locking device preferably comprises a plurality of actuating levers that are mounted at various position on the undercarriage, for example at both ends of the undercarriage.

The transport device according to the invention is preferably further provided with a guide device, which during the positioning of an interior component module disposed on the transport device in its final assembly position in the aircraft fuselage element is adapted to interact with a complementary guide device that is provided in the aircraft fuselage element. For example, on the undercarriage and/or on the interior component module carrier unit of the transport device according to the invention a suitable projection may be formed, which is adapted to interact with a guide rail provided on the aircraft fuselage element in order to position the transport device and hence an interior component module disposed on the transport device in a desired final assembly position in the aircraft fuselage element.

The transport device according to the invention may further comprise at least one sensor for detecting the position of the transport device and/or the position of an interior component module mounted on the transport device. For example on the C-shaped carrier unit of the interior component module carrier unit at least one sensor may be provided, which is adapted to output signals that are characteristic of the position of the transport device and/or the position of an interior component module mounted on the transport device relative to an aircraft fuselage element. The use of such an electronic measuring device allows an interior component module that is provided for transport on the transport device according to the invention to be positioned particularly precisely in its final assembly position in the aircraft fuselage element.

The transport device according to the invention may further comprise a control unit that controls the operation of the first and/or the second power-assist device in dependence upon signals of the at least one sensor for detecting the position of the transport device and/or the position of an interior component module mounted on the transport device. Particularly if the first and/or the second power-assist device is/are fashioned in such a way that a movement of at least a part of the interior component module carrier unit and hence of an interior component module mounted on the interior component module carrier unit relative to the undercarriage of the transport device according to the invention is possible without additional manual assistance, the control unit more or less allows an interior component module mounted on the transport device to be positioned fully automatically in its final assembly position in the aircraft fuselage element.

The transport device according to the invention may further comprise a step device that is fastened to the undercarriage. The step device may be adapted to be stepped on by an operator of the transport device in order to make an upper region of the transport device and/or of the interior component module mounted on the transport device accessible to the operator. A transport device provided with a step device is particularly comfortable to operate. In particular, the provision of a step device on the transport device according to the invention is recommended if interior component modules provided for transport on the transport device have to be fastened above head height in the aircraft fuselage element.

BRIEF DESCRIPTION OF DRAWINGS

There now follows a detailed description of a preferred embodiment of a transport device according to the invention with reference to the accompanying, diagrammatic drawings, which show FIG. 1 a three-dimensional representation of a transport device for use when mounting interior component modules in an aircraft, FIG. 2 the transport device according to FIG. 1 with an interior component module mounted thereon, FIG. 3 a side view of the transport device with an interior component module fastened thereon in accordance with FIG. 2 and FIG. 4 a detailed view of a guide device provided on the transport device and interacting with a complementary guide device provided in an aircraft fuselage element.

DETAILED DESCRIPTION OF DRAWINGS

Figure 1:
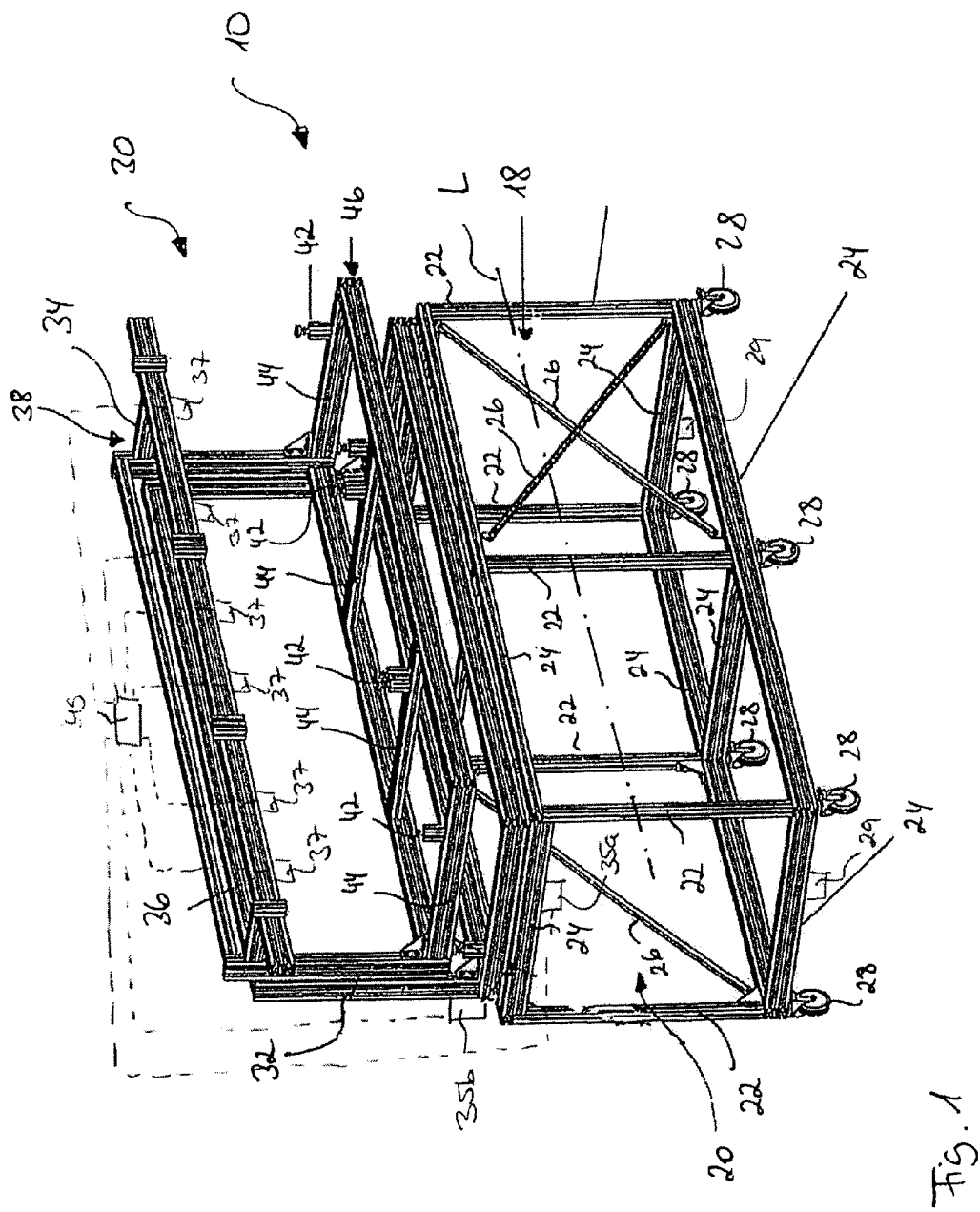
Figure 2:
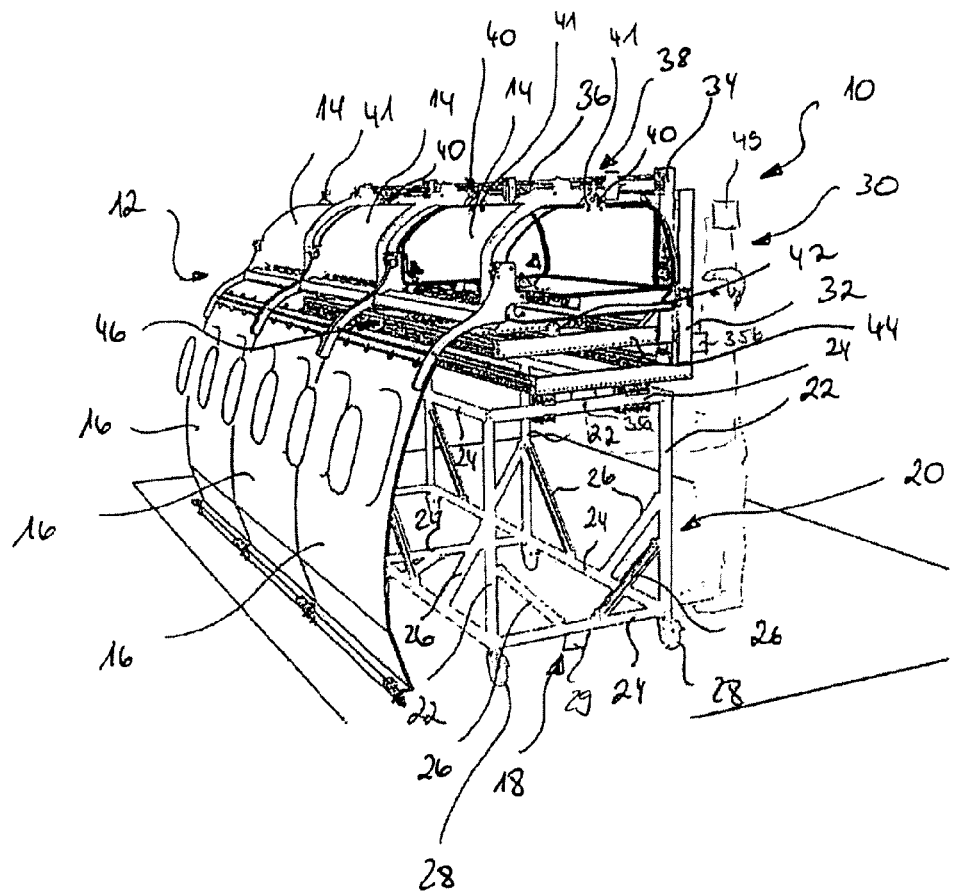
Figure 3:
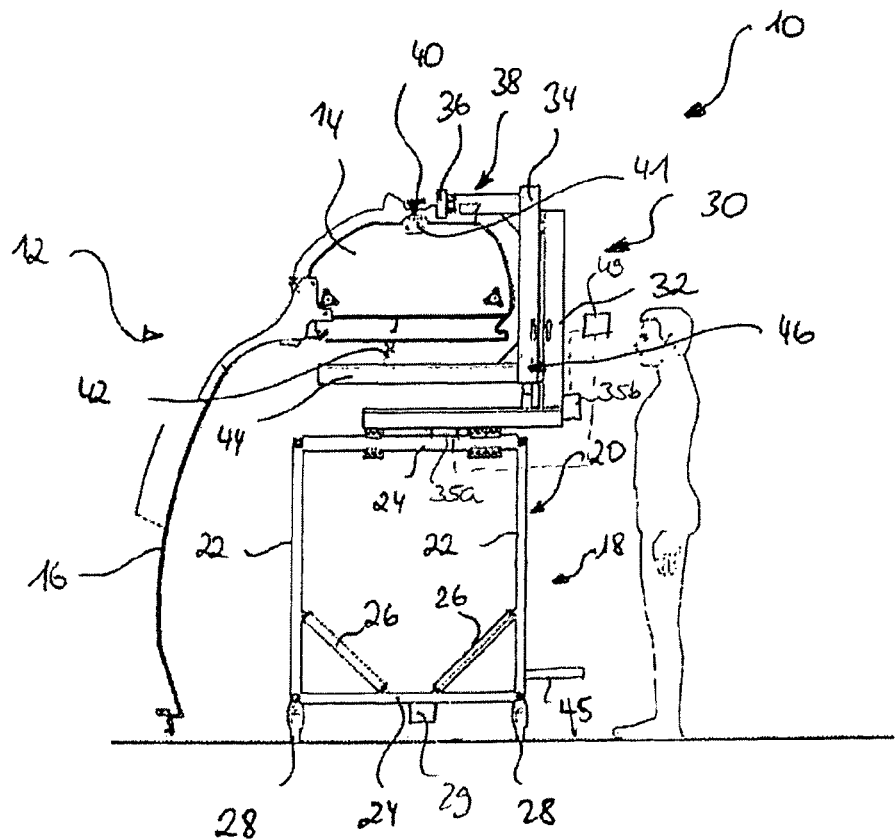

A transport device 10 that is represented in FIGS. 1 to 3 is provided for use when mounting interior component modules 12 in an aircraft. In the embodiment shown in the figures the transport device 10 is used to transport interior component modules 12 that have been preassembled outside of the aircraft and comprise in each case three mutually adjacent overhead luggage compartments 14 as well as three side lining panels 16 connected in each case to the overhead luggage compartments 14. The interior component modules 12 may moreover comprise further interior components, such as for example electric lines, air-carrying lines of an aircraft air conditioning system or pipes used for the water supply in the aircraft cabin, personal service units and personal service channels. The transport device 10 is used to transport the interior component modules 12, which have been preassembled and also already tested as far as possible outside of the aircraft, into a final assembly position in an aircraft fuselage element. The aircraft fuselage element is for example a fuselage shell that is open at least one end and enables unimpeded transport of the interior component modules 12 into their final assembly position in the interior of the aircraft fuselage element.

The transport device 10 comprises an undercarriage 18 having a substantially cuboidal basic body 20 that is defined by a plurality of vertical struts 22 and a plurality of horizontal struts 24. For strengthening the undercarriage 18 a plurality of diagonal struts 26 are further provided. A plurality of wheels 28 are fastened to the undercarriage 18. With the aid of the wheels 28 fastened to the undercarriage 18 the transport device 10 may be moved freely in a final assembly installation, such as for example a final assembly hangar.

In order to be able to lock the transport device 10 in a desired position, for example a final assembly position of an interior component module 12 transported on the transport device 10 in the aircraft fuselage element, the transport device 10 comprises a locking device that is not represented in the figures. With the aid of the locking device the wheels 28 of the transport device 10 may be locked, thereby reliably preventing further movement of the transport device 10. The transport device 10 is further provided with a guide device 29, which during positioning of an interior component module 12 accommodated on the transport device 10 in its final assembly position in the aircraft fuselage element, is adapted to interact with a complementary guide device 31 that is provided in the aircraft fuselage element. By virtue of the interacting of the guide device 29 provided on the transport device 10 with the complementary guide device 31 provided on the aircraft fuselage element, the positioning of the interior component module 12 during its final assembly in the aircraft fuselage element is made considerably easier.

Figure 4:
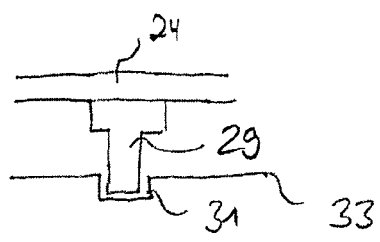

As becomes apparent from FIG. 4, the guide device 29 may have the form of a projection which extends from the undercarriage 18 of the transport device 10. The guide device may be pivotable relative to the undercarriage 18 of the transport device 10 or be a telescoping device. In a non-actuated state depicted in FIGS. 1 to 3 the guide device 29 does not hinder movement of the transport device 10. In an actuated state the guide device 29 the guide device 29 has an increased length and thus is adapted to interact with the complementary guide device 31 of the aircraft fuselage element. The complementary guide device 31 of the aircraft fuselage element may be a rail incorporated into a floor 33 of the aircraft fuselage element, such as e.g. a seat rail.

On the undercarriage 18 of the transport device 10 a two-piece interior component module carrier unit 30 is supported. The interior component module carrier unit 30 comprises an L-shaped carrier unit 32, which is directly connected to the undercarriage 18, as well as a C-shaped carrier unit 34, which is connected to the L-shaped carrier unit 32. In a similar manner to the undercarriage 18, the L-shaped carrier unit 32 and the C-shaped carrier unit 34 of the interior component module carrier unit 30 are also constructed from a plurality of struts.

As may best be seen in FIGS. 2 and 3, a suspension device 40 is mounted on a strut 36, which extends parallel to a longitudinal axis L of the transport device 10, of a horizontal unit 38 of the C-shaped carrier unit 34 that is remote from the undercarriage 18. With the aid of the suspension device 40 the overhead luggage compartments 14 of the interior component module 12 and hence the interior component module 12 as a whole may be fastened in a suspended manner on the transport device 10. The suspension device 40 is of a multi-piece construction and comprises a plurality of individual suspension devices. Each individual suspension device is provided for interacting with a holder 41 that is mounted on the interior component module 12. The suspension device 40 and the holders 41 mounted on the interior component module 12 are each fashioned in such a way that the holder 41 mounted on the interior component module 12 and hence the interior component module 12 may be fastened to the structure of the aircraft fuselage element before the holder 41 mounted on the interior component module 12 is uncoupled from the suspension device 40 of the transport device.

For stabilizing the interior component module 12 in its transport position on the transport device 10 a support device 42 is further provided, which interacts with a base plate of the overhead luggage compartments 14. The support device 42, in a similar manner to the suspension device 40, is of a multi-piece construction and extends from struts 44 of a horizontal unit 46 of the C-shaped carrier unit 34 facing the undercarriage 18 up in a direction parallel to the longitudinal axis L of the transport device 10.

By virtue of the interaction of the suspension device 40 and the support device 42 the interior component module 12 may be accommodated on the transport device 10 in a position corresponding substantially to the position that the interior component module 12 occupies in its finally assembled state in the aircraft fuselage element. After transport on the transport device 10 it is therefore possible to dispense with a laborious repositioning of the interior component module 12 for the final assembly in the aircraft fuselage element.

By means of a sliding unit the L-shaped carrier unit 32 of the interior component module carrier unit 30 is movable horizontally relative to the undercarriage 18. In the embodiment shown in the figures the L-shaped carrier unit 32 of the interior component module carrier unit 30 is movable only in a direction perpendicular to the longitudinal axis L of the transport device 10 (y-direction) relative to the undercarriage 18. However, where desired, it is possible also to provide a horizontal mobility of the L-shaped carrier unit 32 relative to the undercarriage 18 both in y-direction and in a direction parallel to the longitudinal axis L of the transport device 10 (x-direction).

The C-shaped carrier unit 34 of the interior component module carrier unit 30 is moreover movable vertically relative to the L-shaped carrier unit 32 of the interior component module carrier unit 30. For realizing the horizontal mobility of the L-shaped carrier unit 32 relative to the undercarriage 18 and for realizing the vertical mobility of the C-shaped carrier unit 34 relative to the L-shaped carrier unit 32 the transport device 10 is provided with a first as well as a second power-assist device 35a, 35b. The first power-assist device 35a effects the horizontal movement of the L-shaped carrier unit 32 relative to the undercarriage 18, and the second power-assist device 35b effects the vertical movement of the C-shaped carrier unit 34 relative to the L-shaped carrier unit 32. By virtue of the movable arrangement of the C-shaped carrier unit 34 and the L-shaped carrier unit 32 of the interior component module carrier unit 30, the horizontal and the vertical position of an interior component module 12 connected to the interior component module carrier unit 30 may be finely adjusted during final assembly in the aircraft fuselage element.

A plurality of sensors 37 are moreover mounted on the strut 36 of the C-shaped carrier unit 34, see FIG. 1. The sensors are used to detect the position of an interior component module 12 mounted on the transport device 10 relative to the aircraft fuselage element. The signals output by the sensors may be supplied to a control unit 49 configured for example in the form of an electronic control unit. The control unit 49 may then control the operation of the first and/or the second power-assist device 35a, 35b in dependence upon the sensor signals, so that the interior component module 12 mounted on the transport device 10 may be brought more or less automatically into its final assembly position in the aircraft fuselage element.

The undercarriage 18 of the transport device 10 may moreover be connected to a step device 45, an example of which is represented in FIG. 3. The step device 45 is adapted to be stepped on by an operator of the transport device 10. An upper region of the transport device 10 and an upper region of an interior component module 12 mounted on the transport device 10 are therefore made accessible to the operator. The operator may therefore comfortably fasten the interior component module 12 even in an overhead position to the structure of the aircraft fuselage element.

The invention claimed is:

1. A transport device for use when mounting interior component modules in an aircraft, comprising:
    an undercarriage having a plurality of wheels coupled thereto, and
    an interior component module carrier unit, which is supported on the undercarriage and adapted to be connected to an interior component module, which has been preassembled outside of the aircraft, in order to transport the interior component module with the aid of the transport device into a final assembly position in an aircraft fuselage element, the interior component module carrier unit having a two-piece construction comprising an L-shaped carrier unit connected to the undercarriage and a C-shaped carrier unit connected to the L-shaped carrier unit,
    wherein at least a part of the interior component module carrier unit is movable in such a way relative to the undercarriage that the interior component module connected to the interior component module carrier unit is movable horizontally and vertically relative to the undercarriage,
    and wherein the transport device is provided with a guide device in the form of a projection, separate from the plurality of wheels, coupled to the undercarriage, which during the positioning of the interior component module in its final assembly position in the aircraft fuselage element, is adapted to interact with a complementary guide device that is provided in the aircraft fuselage element.

2. The transport device according to claim 1, characterized in that the L-shaped carrier unit of the interior component module carrier unit is movable horizontally relative to the undercarriage.

3. The transport device according to claim 1, characterized in that the C-shaped carrier unit of the interior component module carrier unit is movable vertically relative to the L-shaped carrier unit of the interior component module carrier unit.

4. The transport device according to claim 1, characterized in that provided on the interior component module carrier unit at least one of a suspension device for fastening the interior component module in a suspended manner on the transport device and a support device for supporting the interior component module on the transport device.

5. The transport device according to claim 4, characterized in that the suspension device is mounted on a horizontal unit of the C-shaped carrier unit of the interior component module carrier unit that is remote from the undercarriage.

6. The transport device according to claim 4, characterized in that the support device is mounted on a horizontal unit of the C-shaped carrier unit of the interior component module carrier unit that faces the undercarriage.

7. The transport device according to claim 1, characterized by a first power-assist device for assisting the horizontal movement of the at least a part of the interior component module carrier unit relative to the undercarriage.

8. The transport device according to claim 1, characterized by a second power-assist device for assisting the vertical movement of the at least a part of the interior component module carrier unit relative to the undercarriage.

9. The transport device according to claim 1, characterized in that the undercarriage comprises a plurality of vertical struts and a plurality of horizontal struts, which define a substantially cuboidal basic body of the undercarriage that is strengthened by means of a plurality of diagonal struts.

10. The transport device according to claim 1, characterized in that a plurality of wheels are fastened to the undercarriage, and that the transport device is provided with a locking device for locking the transport device, if need be, in a desired position.

11. The transport device according to claim 1, characterized in that on the transport device at least one sensor is provided for detecting at least one of the position of the transport device and the position of the interior component module that is mounted on the transport device.

12. The transport device according to claim 11,
characterized by a first power-assist device for assisting the horizontal movement of the at least a part of the interior component module carrier unit relative to the undercarriage,
characterized by a second power-assist device for assisting the vertical movement of the at least a part of the interior component module carrier unit relative to the undercarriage, and
characterized by a control unit that controls the operation of at least one of the first and the second power-assist device in dependence upon signals of the at least one sensor for detecting the at least one of the position of the transport device and the position of an interior component module that is mounted on the transport device.

13. The transport device according to claim 1, characterized by a step device that is fastened to the undercarriage and is adapted to be stepped on by an operator of the transport device in order to make at least one of an upper region of the transport device and of the interior component module mounted on the transport device accessible to the operator.

* * * * *